Figure 1:
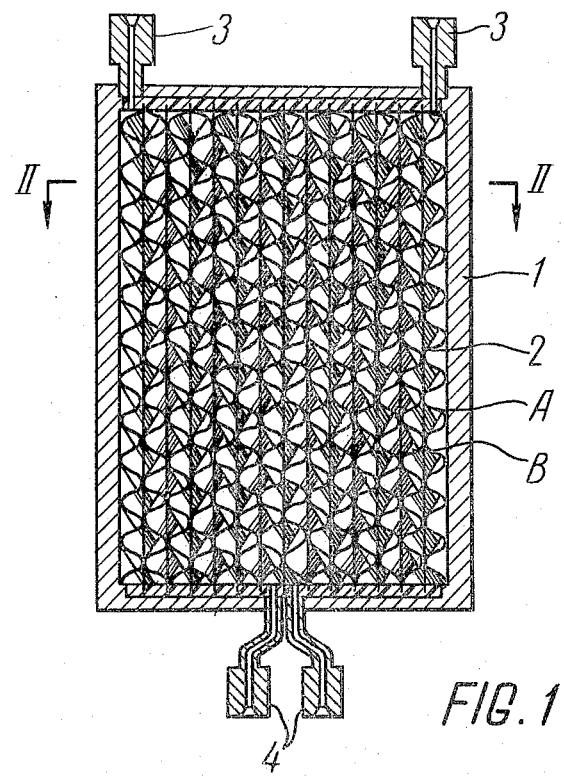

United States Patent [19]
Gryaznov et al.

[11] 3,849,076
[45] Nov. 19, 1974

[54] CATALYTIC REACTOR FOR CARRYING OUT CONJUGATE CHEMICAL REACTIONS

[76] Inventors: Vladimir Mikhailovich Gryaznov, Leninskie Gory, MGU Zona L, kv. 11; Viktor Sergeevich Smirnov, Kutuzovsky prospekt, 26, kv. 555; Alexandr Petrovich Mischenko, Khersonskaya ulitsa, 7, korpus 4, kv. 515; Sergei Ivanovich Aladyshev, ulitsa Grimau, 7/2, korpus 4, kv. 77, all of Moscow, U.S.S.R.

[22] Filed: June 21, 1972

[21] Appl. No.: 265,000

[52] U.S. Cl. .......... 23/288 R, 23/288 M, 23/288 K, 48/DIG. 5, 165/164, 165/165, 55/158, 55/16, 260/672 R, 260/680 R
[51] Int. Cl. ............................. B01j 9/04, C07c 3/58
[58] Field of Search ......... 23/288 R, 288 M, 288 K; 48/DIG. 5; 165/164, 165; 55/16, 158; 260/680 R, 672 R, 669, 683.3

[56] References Cited
UNITED STATES PATENTS

| 1,036,609 | 8/1912 | Grosvenor | 23/288 R X |
| 2,131,265 | 9/1938 | Bichowsky | 165/165 |
| 3,210,162 | 10/1965 | Rudd | 23/288 R X |
| 3,450,500 | 6/1969 | Setzer et al. | 23/288 R X |

*Primary Examiner*—James H. Tayman, Jr.
*Attorney, Agent, or Firm*—Waters, Roditi, Schwartz & Nissen

[57] ABSTRACT

A catalytic reactor for carrying out conjugate chemical reactions, comprising a hallow body the inner space of which is subdivided into two compartments by a partition in the form of a plate coiled as a double spiral. Each compartment serves for carrying out one of the reactions to be conjugated. The plate is made of a material which is selectively permeable to a reactant common to the reactions being conjugated and features catalytic activity with regard to the both reactions.

3 Claims, 2 Drawing Figures

CATALYTIC REACTOR FOR CARRYING OUT CONJUGATE CHEMICAL REACTIONS

The present invention relates to chemical reactors and more particularly to catalytic reactors for carrying out conjugate chemical reactions without intermixing the initial substances participating in the processes being conjugated. The reactor of the present invention may also be employed for producing high-purity hydrogen from hydrocarbon stock materials.

Known in the art is a catalytic reactor for carrying out coupled chemical reactions, this reactor comprising a body with a partition accommodated therein. Said partition is constituted by a system of thin-walled tubes fixed at one and to the cover of the reactor and on the other end to the bottom thereof so that the reaction space of the apparatus is divided into two zones. The inner space of the reactor body serves for carrying out dehydrogenation reactions, and the inner space of the tubes serves for carrying out hydrodealkylation reactions. The tubes are made of a material selectively permeable to hydrogen and featuring catalytic activity in the dehydrogenation and hydrodealkylation reactions.

With the reactor in operation, a hydrocarbon is fed into the tubes, this hydrocarbon undergoing dehydrogenation on the surface of the tube walls with the evolution of hydrogen, while a hydrocarbon fed into the reactor outside of the tubes undergoes a reaction of hydrogen addition.

The hydrogen which evolves in the course of dehydrogenation inside the tube diffuses through the wall of the tube and at the external surface thereof enters an addition reaction with the hydrocarbon fed into the inner space of the reactor. Thus, a conjugating of the two reactions is ensured in the reactor without intermixing the reactants, but only by virtue of the transfer of the reactant common to the both reactions, namely, hydrogen, from one zone of the reactor into the other.

The known reactor, however, is disadvantageous in view of the presence of a great number of soldered or welded connections, which makes the reactor assembly very complicated. Besides, such reactors are disadvantageous in that the surface area of the tubes, i.e., of the catalyst participating in the catalytic process, is commensurate with the surface area of the material of the reactor body is made of, which may lead to undesirable side processes of carbon formation and decomposition of the reactants, thus impairing the reliability and effectiveness of the reactor operation.

It is an object of the present invention to provide such a catalytic reactor for carrying out conjugated chemical reactions, wherein the length of soldered connections is moderate, so that the reactor assembly can be materially facilitated, and wherein the ratio of the surface area of the structural material to that of the catalytically active material is minimized.

This object is accomplished by a catalytic reactor for carrying out conjugate chemical reactions, comprising a hollow body the inner space of which is divided by a partition into two compartments, each of these compartments serving for carrying out one of the reactions to be conjugated and being provided with pipes for feeding initial reactants and for removing the reaction products, said partition being made of a material selectively permeable to a component common to the reactions being conjugated and featuring catalytic activity with regard to both conjugated reactions, and according to the invention, the partition is made as a plate coiled as a double spiral and having its edges built into the reactor body.

Such a construction of the reactor with the use of a plate coiled as a double spiral allows a reduction in the number of soldered or welded connections, since sealing of the reactor spaces is effected only along the edges of the plate. The ratio of the surface area of the structural material to that of the catalyst is essentially reduced in such a reactor, which makes possible a reduction in the formation of side products and carbon.

Figure 2:
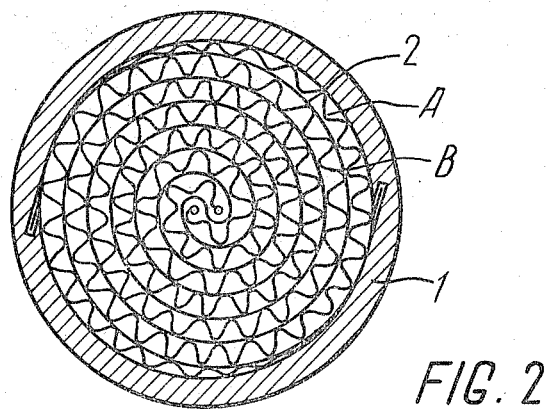

The present invention will become more fully apparent from a consideration of an exemplary embodiment thereof described hereinbelow with due reference to the accompanying drawings, wherein:

FIG. 1 is a longitudinal sectional view of a catalytic reactor for carrying out coupled chemical reactions, according to the invention; and FIG. 2 is a section taken along line II—II in FIG. 1.

Referring now to FIG. 1, the catalytic reactor for carrying out conjugate chemical reactions comprises a hollow cylindrical body 1 whose inner space is subdivided into two compartments A and B (FIGS. 1 and 2) by a partition, this partition being constituted as a thin-walled plate 2 coiled as a double spiral. The compartment A serves for carrying out one of the conjugate reactions, and the compartment B serves for carrying out the other of the conjugate reactions. The plate 2 is made of a material which is selectively permeable to a reactant common to the both reactions being conjugated and features catalytic activity with regard to both reactions. The edges of plate 2 are built into the walls of the body 1 of the reactor. Initial reactants are fed into the compartments A and B of the reactor through pipes 3 (FIG. 1), and the reaction products are removed from the reactor through pipes 4.

For preventing deformation of the plate 2, corrugated sheets 6 are inserted into the compartments A and B.

The catalytic reactor for carrying out conjugate chemical reactions operates as follows.

The reactor is heated to the temperature required for carrying out the reactions to be conjugated. Through pipes 3 a substance required for carrying out one of the conjugate reactions is fed into the compartment A, and a substance required for carrying out the other of the conjugate reactions is fed into the compartment B. The first-mentioned substance starts reacting on the catalytically active surface of the plate 2 with formation of the desired product and of a reactant common to the both conjugate reactions; this common reactant dissolves in the material of the plate 2 and diffuses onto the opposite surface of the plate 2 into the compartment B wherein the second-mentioned substance is present. The common reactant which has passed through the plate 2 starts reacting with the second substance, giving the second desired product. The resulting reaction products are removed from the compartments A and B through the pipes 4.

It is possible to feed the first substance into the compartment B of the reactor and the second substance, into the compartment A thereof.

The present reactor can be employed, for example, for carrying out dehydrogenation and hydrodealkylation reactions. In this case, the plate 2 is manufactured from a palladium alloy which is active for carrying out dehydrogenation and hydrodealkylation reactions. The compartment A is fed, for example, with isoamylene and the compartment B, with toluene.

Isoamylene undergoes a dehydrogenation reaction with the formation of isoprene and the evolution of hydrogen. This hydrogen is dissolved in the palladium alloy and diffuses onto the surface of the plate 2 which faces the compartment B.

The highly active atomic hydrogen which has passed through the plate 2 reacts with toluene to form reaction products of benzene and methane.

The resulting isoprene and benzene are removed from the reactor through the pipes 4.

In the present reactor, it is possible to create a large catalytic surface area per unit volume of the reactor by closely winding the double spiral from the catalyst plate.

What is claimed is:

1. A catalytic reactor for carrying out conjugate chemical reactions, said reactor comprising: a hollow body encluding a cylindrical casing and opposite end covers, a thin-wall plate disposed in said body and coiled as a double spiral to define two reaction zones separated from one another by said thin-wall plate, said thin-wall plate being made of a palladium alloy that is selectively permeable to hydrogen and is catalytically active with regard to the reactions taking place in said two zones, said thin-wall plate having upper and lower edges which are sealably engaged in said covers of the body and end edges which are sealably engaged in the said casing, inlet means for feeding reactant products into said zones respectively, and outlet means for discharging the reaction products from said respective zones, said inlet means being disposed at one of the end covers and the outlet means at the other of the end covers, one of said inlet and outlet means comprising two conduits at diametrically opposite locations proximate said casing, and the other of said inlet and outlet means comprising two conduits adjacent one another centrally in said casing.

2. A catalytic reactor as claimed in claim 1 comprising means inserted between spiral turns of said thin-wall plate for preventing deformation of the thin-wall plate.

3. A catalytic reactor as claimed in claim 2 wherein said means comprises corrugated sheets.

* * * * *